(12) United States Patent
Younes et al.

(10) Patent No.: US 10,550,733 B2
(45) Date of Patent: Feb. 4, 2020

(54) SUPERCRITICAL $CO_2$ CYCLE COUPLED TO CHEMICAL LOOPING ARRANGEMENT

(71) Applicant: Saudi Arabian Oil Company, Dhahran (SA)

(72) Inventors: Mourad Younes, Dhahran (SA); Aadesh Harale, Dhahran (SA); Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/018,706

(22) Filed: Jun. 26, 2018

(65) Prior Publication Data

US 2019/0390578 A1 Dec. 26, 2019

(51) Int. Cl.
*F01K 25/10* (2006.01)
*F23C 10/18* (2006.01)
(Continued)

(52) U.S. Cl.
CPC .............. *F01K 25/103* (2013.01); *F01K 7/32* (2013.01); *F23C 10/01* (2013.01); *F23C 10/18* (2013.01);
(Continued)

(58) Field of Classification Search
CPC . F01K 25/103; F01K 7/16; F01K 7/32; F01K 25/08; F01K 25/10; Y02E 20/346;
(Continued)

(56) References Cited

U.S. PATENT DOCUMENTS

| | | | | |
|---|---|---|---|---|
| 5,447,024 A | * | 9/1995 | Ishida | F01K 3/188 |
| | | | | 60/39.461 |
| 8,555,652 B1 | * | 10/2013 | Touchton | F02C 3/20 |
| | | | | 60/775 |

(Continued)

FOREIGN PATENT DOCUMENTS

| CN | 106321177 A | 1/2017 |
|---|---|---|
| CN | 106438043 A | 1/2017 |

OTHER PUBLICATIONS

No Author. "SAACKE Energy Efficiency Flue Gas Heat Exchanger." SAACKE GmbH. No date. 2 pages.
(Continued)

*Primary Examiner* — Mark A Laurenzi
*Assistant Examiner* — Xiaoting Hu
(74) *Attorney, Agent, or Firm* — Leason Ellis LLP (57) ABSTRACT

Systems and methods for coupling a chemical looping arrangement and a supercritical $CO_2$ cycle are provided. The system includes a fuel reactor, an air reactor, a compressor, first and second heat exchangers, and a turbine. The fuel reactor is configured to heat fuel and oxygen carriers resulting in reformed or combusted fuel and reduced oxygen carriers. The air reactor is configured to re-oxidize the reduced oxygen carriers via an air stream. The air stream, fuel, and oxygen carriers are heated via a series of preheaters prior to their entry into the air and fuel reactors. The compressor is configured to increase the pressure of a $CO_2$ stream to create a supercritical $CO_2$ stream. The first and second heat exchangers are configured to heat the supercritical $CO_2$ stream, and the turbine is configured to expand the heated supercritical $CO_2$ stream to generate power.

27 Claims, 3 Drawing Sheets

(51) Int. Cl.
*F23C 10/01* (2006.01)
*F01K 7/32* (2006.01)
*F23C 10/26* (2006.01)

(52) U.S. Cl.
CPC ........ *F23C 10/26* (2013.01); *F23C 2206/103* (2013.01)

(58) Field of Classification Search
CPC ............... F23C 2900/99008; F23C 10/01; F23C 10/18; F23C 10/22; F23C 10/26; F23C 13/00; F23C 13/06; F23C 2206/103; F02C 3/04; F02C 3/26; F02C 3/34; F02C 6/00; F02C 6/04
See application file for complete search history.

(56) References Cited

U.S. PATENT DOCUMENTS

| | | | |
|---|---|---|---|
| 9,346,013 B2 * | 5/2016 | Moghtaderi | ............ C01B 13/08 |
| 9,550,680 B2 | 1/2017 | Andrus, Jr. et al. | |
| 9,651,252 B2 | 5/2017 | Abanades Garcia et al. | |
| 9,841,242 B2 * | 12/2017 | Zhang | ..................... F28D 19/04 |
| 2009/0020405 A1 * | 1/2009 | Fan | .......................... B01J 19/00 |
| | | | 201/12 |
| 2011/0198861 A1 | 8/2011 | Jallais et al. | |
| 2013/0255272 A1 * | 10/2013 | Ajhar | ........................ F02C 3/28 |
| | | | 60/780 |
| 2015/0240665 A1 | 8/2015 | Stapp | |
| 2016/0017798 A1 * | 1/2016 | Younes | ..................... F02C 3/22 |
| | | | 60/780 |
| 2016/0348539 A1 | 12/2016 | Peter et al. | |

OTHER PUBLICATIONS

Willmott. "Regenerative Heat Exchangers." Thermopedia™. DOI: 10.1615/AtoZ.r.regenerative_heat_exchangers. www.thermopedia.com/content/1087/. Feb. 2, 2011. 15 pages.

International Search Report and Written Opinion in corresponding Application No. PCT/US2019/039298, dated Jun. 26, 2019. 11 pages.

* cited by examiner

SUPERCRITICAL $CO_2$ CYCLE COUPLED TO CHEMICAL LOOPING ARRANGEMENT

TECHNICAL FIELD

The present disclosure is related to systems and methods regarding supercritical $CO_2$ cycles and chemical looping combustion. In particular, the present disclosure is related to systems and methods for coupling a supercritical $CO_2$ cycle and a chemical looping combustion arrangement.

BACKGROUND OF THE INVENTION

As the need for energy continues to grow, so does the use of unconventional energy resources to meet the increasing demand. While well-known energy sources (e.g., coal, natural gas) continue to have value, other energy sources such as unconventional oil resources and unconventional natural gas resources are being used to meet the increasing energy demand. One such unconventional resource is sour gas, which is a natural gas that contains significant levels of hydrogen sulfide ($H_2S$). $H_2S$ presents a problem during processing of the sour gas, as the corrosive nature of $H_2S$ can damage the mechanical parts of a system, and the processing of $H_2S$ can result in the production of $SO_2$, which is an air pollutant.

Combustion is a commonly used reaction in the field of power generation and can be modified to use sour gas as fuel. However, combustion reactions, and specifically direct combustion reactions, still present the same corrosion and pollution issues associated with sour gas fuel. To avoid excessive corrosion and pollution associated with sour gas combustion, pretreatment or "sweetening" of the sour gas has been required to substantially remove the sulfur compounds from the gas stream. However, this "sweetening" process is typically very costly.

Chemical looping combustion (CLC), a specific type of combustion reaction, eliminates the need for a "sweetening" pre-treatment and can be used in a system for $CO_2$ capture as well. In a conventional CLC process, an oxygen carrier acts as an intermediate transporter of oxygen between air and fuel, and thus the air and the fuel are prevented from directly contacting one another. Typically, a solid metal oxide oxygen carrier is used to oxidize the fuel stream in a fuel reactor. This results in the production of $CO_2$ and $H_2O$. The reduced form of the oxygen carrier is then transferred to the air reactor, where it is contacted with air, re-oxidized to its initial state, and then returned to the fuel reactor for further combustion reactions.

Despite their advantages over direct combustion processes, CLC processes are still inefficient in terms of their ability to produce energy. Additionally, CLC processes traditionally require coupling to steam cycles to produce power. Accordingly, there is a need for a cost-effective and energy-efficient system that combines the combustion of sour gas with power generation. Further, there is a need for a process for the combustion of sour gas with high efficiency in energy conversion, with reduced amount of water especially in water scarce environments.

SUMMARY OF THE INVENTION

The present application describes system and methods for coupling a chemical looping arrangement and a supercritical $CO_2$ cycle. According to a first aspect, a system for coupling a chemical looping arrangement and a supercritical $CO_2$ cycle is provided in which the system includes a fuel reactor having a fuel inlet configured to receive fuel from a fuel source and a carrier inlet configured to receive oxygen carriers. The fuel reactor is configured to react the fuel with the oxygen carriers resulting in reformed or combusted fuel and reduced oxygen carriers. They system also includes an air reactor in fluid communication with the fuel reactor. The air reactor has an air stream inlet configured to receive an air stream from an air source and is configured to receive the reduced oxygen carriers from the fuel reactor. The air reactor is also configured to re-oxidize the reduced oxygen carriers via the air stream resulting in oxygen-depleted air. The air reactor is also configured to transport a first portion of the re-oxidized oxygen carriers back to the fuel reactor.

The system further includes a compressor having a $CO_2$ inlet configured to receive a $CO_2$ stream from a $CO_2$ source. The compressor is configured to increase the pressure of the $CO_2$ stream thereby creating a high pressure supercritical $CO_2$ stream. The system also includes, a first heat exchanger in fluid communication with the compressor and the fuel reactor. The first heat exchanger is configured to receive and heat the supercritical $CO_2$ stream, and is configured to receive at least a portion of the reformed or combusted fuel from the fuel reactor. The energy from the reformed or combusted fuel is used to heat the supercritical $CO_2$ stream. Also included in the system is a second heat exchanger in fluid communication with the first heat exchanger and the air reactor. The second heat exchanger is configured to receive and further heat the supercritical $CO_2$ stream received from the first heat exchanger. It is also configured to receive the oxygen-depleted air and a second portion of the re-oxidized oxygen carrier from the air reactor. The energy from the oxygen-depleted air and the second portion of the re-oxidized oxygen carrier is used to heat the supercritical $CO_2$ stream in the second heat exchanger.

The system also includes a turbine in fluid communication with the second heat exchanger. The turbine is configured to receive the supercritical $CO_2$ stream from the second heat exchanger and expand the supercritical $CO_2$ such that the expansion of the supercritical $CO_2$ generates power. The turbine also includes an outlet for the expanded supercritical $CO_2$. The expanded supercritical $CO_2$ is used to heat the fuel from the fuel source and the air stream from the air source prior to their respective deliveries to the fuel reactor and the air reactor.

According to a further aspect, the system can include a first conduit in fluid communication with the turbine and configured to receive a first portion of the expanded supercritical $CO_2$ from the turbine. The system can also include a second conduit in fluid communication with the turbine and configured to receive a second portion of the expanded supercritical $CO_2$ from the turbine. The system can also include an air preheater and a first fuel preheater. The air preheater is in fluid communication with the first conduit, the air source, and the air reactor. The air preheater is configured to heat the air stream using the energy of the first portion of the expanded supercritical $CO_2$ prior to delivery of the air stream to the air reactor. The first fuel preheater is in fluid communication with the second conduit, the fuel source, and the fuel reactor, and the first fuel preheater is configured to heat the fuel stream using the energy of the second portion of the expanded supercritical $CO_2$ prior to delivery of the fuel stream to the fuel reactor. The heating of the air stream in the air preheater and the fuel stream in the first fuel preheater by the respective portions of expanded supercritical $CO_2$ results in respective low-pressure streams of $CO_2$.

According to a further aspect, the system includes a cooler in fluid communication with the air preheater and the first fuel preheater. The cooler is configured to receive the respective low-pressure streams of $CO_2$ from the air preheater and the first fuel preheater and cool the received low pressure $CO_2$. The system can further include a third conduit in fluid communication with the cooler and the compressor. The third conduit is configured to receive the cooled low-pressure $CO_2$ and transfer the cooled low-pressure $CO_2$ to the compressor.

According to another aspect, the system can further include a second fuel preheater in fluid communication with the fuel reactor, the first fuel preheater and the first heat exchanger. The second fuel preheater is configured to receive the fuel stream delivered from the first preheater and at least a portion of the reformed or combusted fuel from the fuel reactor. The second fuel preheater is also configured to further heat the fuel stream via energy from the reformed or combusted fuel prior to the delivery of the fuel stream to the fuel reactor.

According to another aspect, the system further includes a solids preheater in fluid communication with the fuel reactor. The solids preheater is configured to receive a portion of the reformed or combusted fuel from the fuel reactor and to heat the oxygen carriers using the energy of the reformed or combusted fuel prior to delivery of the oxygen carriers to the fuel reactor.

According to another aspect, the fuel reactor comprises a gas-solid separator configured to separate the reduced oxygen carriers from the reformed or combusted fuel. According to another aspect, the system includes a controller configured to operate the fuel reactor in a temperature range of about 800° C. to about 1100° C.

According to another aspect, the air reactor comprises a gas-solid separator configured to separate re-oxidized oxygen carriers from the oxygen-depleted air. According to another aspect, the system includes a controller configured to operate the air reactor in a temperature range of about 900° C. to about 1200° C.

According to a further aspect, the compressor is a multistage compressor having intercooling stages. The intercooling stages enable efficient compression of $CO_2$ from a low-pressure side of the supercritical $CO_2$ cycle and transfer of the compressed $CO_2$ to a high-pressure side of the supercritical $CO_2$ cycle.

According to another aspect in which the resulting fuel following reaction in the fuel reactor is a reformed fuel, the system further comprises a fuel cooler in fluid communication with the solids preheater and the first heat exchanger. The fuel cooler is configured to receive the reformed fuel from the solids preheater and the first heat exchanger, and to cool the received reformed fuel to about ambient temperature. The system can further comprise a second compressor in fluid communication with the fuel cooler, the second compressor being configured to compress the ambient temperature reformed fuel received from the fuel cooler. The system can further comprise a combustion chamber in fluid communication with the second compressor and the turbine, the combustion chamber being configured to combust the compressed reformed fuel received from the second compressor to generate a stream of $CO_2$ and water vapor, and to feed the stream of generated $CO_2$ and water vapor to the turbine. According to a further aspect, the system can further comprise a gas processing unit in fluid communication with the turbine and downstream of the fuel cooler, the gas processing unit being configured to separate the stream of $CO_2$ and the water vapor received from the turbine from a low pressure $CO_2$ stream received from the turbine.

According to another aspect, a method for power generation using a coupled chemical looping arrangement and a supercritical $CO_2$ cycle is provided. In the method, a fuel stream from a fuel source and an air stream from an air source are heated. The fuel stream and oxygen carriers are introduced into a fuel reactor, and the fuel reactor operates under first reaction conditions to result in reformed or combusted fuel and reduced oxygen carriers. The air stream is introduced into an air reactor and the reduced oxygen carriers are transferred from the fuel reactor into the air reactor. The air reactor operates under second reaction conditions to re-oxidize the reduced oxygen carriers resulting in oxygen-depleted air. A first portion of the re-oxidized oxygen carriers is transferred back to the fuel reactor. A $CO_2$ stream is introduced into a compressor, and the compressor is configured to increase the pressure of the $CO_2$ stream to create a supercritical $CO_2$ stream. Both the supercritical $CO_2$ stream from the compressor and the reformed or combusted fuel from the fuel reactor are transferred to a first heat exchanger, which operates to transfer heat from the reformed or combusted fuel to the supercritical $CO_2$ stream. The supercritical $CO_2$ stream from the first heat exchanger, the oxygen-depleted air from the air reactor, and a second portion of the re-oxidized oxygen carriers from the air reactor are all transferred to a second heat exchanger, which operates to transfer heat from the oxygen-depleted air and the re-oxidized oxygen carriers to the supercritical $CO_2$ stream. The supercritical $CO_2$ stream from the second heat exchanger is received by a turbine, and the turbine operates under conditions to expand the supercritical $CO_2$ to generate power. The expanded supercritical $CO_2$ is used to heat the fuel from the fuel source and the air stream from the air source prior to their respective deliveries to the fuel reactor and the air reactor.

According to another aspect, a first portion of the expanded supercritical $CO_2$ is transferred from the turbine to a first conduit, and a second portion of the expanded supercritical $CO_2$ is transferred from the turbine to a second conduit. The first portion of the expanded supercritical $CO_2$ from the first conduit is then received by an air preheater and the second portion of the expanded supercritical $CO_2$ from the second conduit is then received by a first fuel preheater. The air preheater is configured to transfer energy of the first portion of the expanded supercritical $CO_2$ to the air stream to heat the air stream. The first fuel preheater is configured to transfer energy of the second portion of the expanded supercritical $CO_2$ to the fuel stream to heat the fuel stream. The transfer of energy from the respective portions of expanded supercritical $CO_2$ results in respective streams of low pressure $CO_2$.

According to a further aspect, the respective streams of low pressure $CO_2$ from the air preheater and the first fuel preheater are received by a cooler, and the cooler is operated at conditions to cool the received low pressure $CO_2$. The cooled low-pressure $CO_2$ is transferred from the cooler to a third conduit, and the cooled low-pressure $CO_2$ is then transferred from the third conduit to the compressor.

According to another aspect, the fuel stream is transferred from the first fuel preheater to a second fuel preheater, and the second fuel preheater receives at least a portion of the reformed or combusted fuel from the fuel reactor. The fuel stream is heated in the second fuel preheater by transferring energy from the reformed or combusted fuel to the fuel stream.

According to another aspect, the oxygen carriers are heated via a solids preheater prior to delivery of the oxygen carriers to the fuel reactor. According to a further aspect, the solids preheater receives a portion of the reformed or combusted fuel from the fuel reactor, and the solids preheater heats the oxygen carriers by transferring energy of the reformed or combusted fuel to the oxygen carriers.

According to another aspect, the fuel stream includes a sour gas fuel and the oxygen carriers are calcium-based materials. The reaction between the sour gas fuel and the calcium-based materials causes at least a portion of sulfur in the sour gas fuel to be removed from the fuel stream.

According to another aspect, the reduced oxygen carriers and the reformed or combusted fuel are transferred from the fuel reactor to a gas-solid separator, and in the gas-solid separator, the reduced oxygen carriers are separated from the reformed or combusted fuel.

According to another aspect, the fuel reactor is operated in a temperature range of about 800° C. to about 1100° C., and the air reactor is operated in a temperature range of about 900° C. to about 1200° C.

According to another aspect, the re-oxidized oxygen carriers and the oxygen-depleted air from the air reactor are transferred to a gas-solid separator, and in the gas-solid separator, the re-oxidized oxygen carriers are separated from the oxygen-depleted air.

According to another aspect, the compressor is a multi-stage compressor that includes intercooling stages that enable compression of $CO_2$ from a low-pressure side of the supercritical $CO_2$ cycle and transfer of the compressed $CO_2$ to a high-pressure side of the supercritical $CO_2$ cycle. According to a further aspect, the low-pressure side of the supercritical $CO_2$ cycle is operated in a pressure range of about 45 bar to about 90 bar, and the high-pressure side of the supercritical $CO_2$ cycle is operated in a pressure range of about 200 bar to about 500 bar.

According to another aspect, the temperature of the supercritical $CO_2$ received by the turbine is in a range of about 400° C. to about 1000° C.

According to another aspect, in which the fuel resulting from the reaction in the fuel reactor is a reformed fuel, the reformed fuel received from the solids preheater and first heat exchanger is cooled in a fuel cooler. The cooled reformed fuel is then compressing in a second compressor. The compressed reformed fuel is then combusted in a combustion chamber to produce a stream of $CO_2$ and water vapor, and the produced stream of $CO_2$ and water vapor is then fed to the turbine. According to a further aspect, the stream of $CO_2$ and water vapor received from the turbine is separated via a gas processing unit from a low pressure $CO_2$ stream received from the turbine.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

The present application describes systems and methods for coupling a chemical looping combustion arrangement and a supercritical $CO_2$ cycle. The present application targets challenges regarding energy conversion efficiency and excessive water usage associated with conventional systems and provides solutions to such technical challenges among others.

In one or more embodiments, the system comprises a chemical looping combustion arrangement that comprises an air reactor and a fuel reactor. The fuel reactor receives fuel from a fuel source and receives oxygen carriers. The fuel reactor is configured to heat the received fuel and oxygen carriers. As a result, the fuel is oxidized (combusted) or reformed, resulting in combusted fuel or reformed fuel, respectively, as well as reduced oxygen carriers. The air reactor receives an air stream from an air source and the reduced oxygen carriers from the fuel reactor. The air reactor is configured to re-oxidize the reduced oxygen carriers via a reaction between the reduced oxygen carriers and the air stream. This reaction also results in an oxygen-depleted air stream. A first portion of the re-oxidized oxygen carriers is then transported back to the fuel reactor for additional reactions.

The system further comprises a compressor that receives a $CO_2$ stream from a $CO_2$ source and that is configured to increase the pressure of the $CO_2$ stream to create a high pressure supercritical $CO_2$ stream. The supercritical $CO_2$ stream is transported to a first heat exchanger, where energy from the reformed fuel/combusted fuel stream is used to heat the supercritical $CO_2$ stream. The supercritical $CO_2$ stream is then transported to a second heat exchanger, where energy from the oxygen-depleted air stream and a second portion of the re-oxidized oxygen carrier from the air stream is used to further heat the supercritical $CO_2$ stream. The heated supercritical $CO_2$ stream is transported from the second heat exchanger to a turbine, where the turbine is configured to expand the supercritical $CO_2$ stream to generate power. The expanded supercritical $CO_2$ stream is then used to heat the fuel stream and the air stream prior to their respective deliveries to the fuel reactor and the air reactor.

Thus, the present systems and methods provide a supercritical $CO_2$ cycle that is integrated with a chemical looping cycle such that the supercritical $CO_2$ cycle provides heat to pre-heat the incoming streams into the chemical looping cycle, and where the supercritical $CO_2$ cycle is removing heat from the streams exiting the chemical looping cycle. In other words, in the present system, the hot fluid of a first thermodynamic system (supercritical $CO_2$ cycle) exchanges heat with the cold side of a second thermodynamic system (chemical looping cycle), while the cold fluid of the first thermodynamic system receives heat from the hot side of the second thermodynamic system.

As such, relative to conventional systems, the present systems and methods 1) maximize synergy between the supercritical $CO_2$ cycle and the chemical looping combustion cycle; 2) provides higher energy efficiency, 3) provides increased operation flexibility, 4) provides lower capex, and 5) provides increased power output, including for embodiments in which the fuel is a sour gas fuel. Additionally, the present systems and methods results in less water usage than previous systems as $CO_2$ is used as medium to produce power in the first thermodynamic system rather than water and steam. Further, the increased efficiency of the present systems allows for their usage with power generation plants with $CO_2$ emissions constraints, for example.

The referenced systems and methods for coupling a chemical looping combustion arrangement and a supercritical $CO_2$ cycle are now described more fully with reference to the accompanying drawings, in which one or more illustrated embodiments and/or arrangements of the systems and methods are shown. The systems and methods of the present application are not limited in any way to the illustrated embodiment and/or arrangement. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

Figure 1:
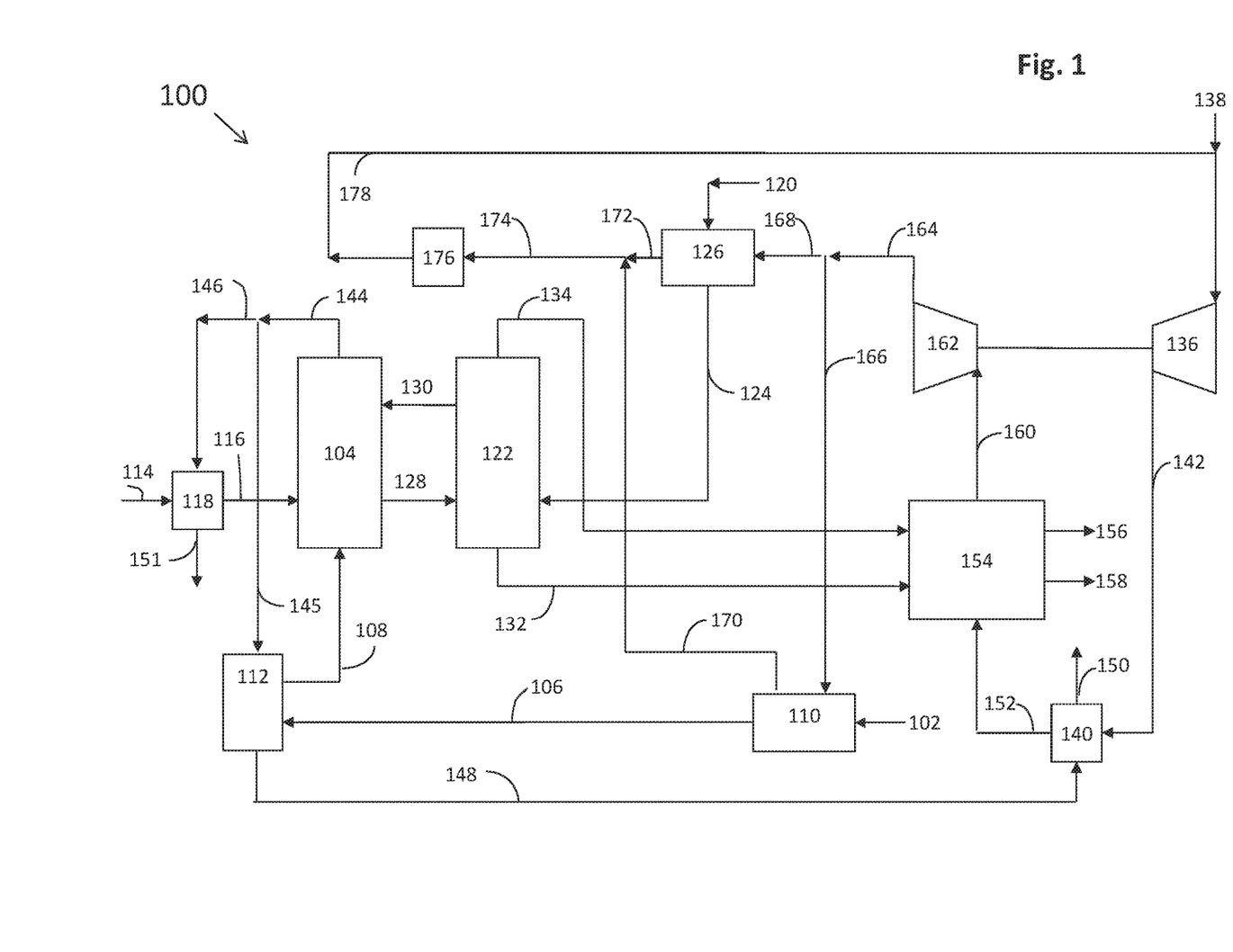
FIG. 1 displays a schematic of an exemplary system that includes a supercritical $CO_2$ cycle coupled to a chemical looping arrangement in accordance with one or more embodiments.

FIG. 1 displays a diagram of an exemplary system 100 that includes a supercritical $CO_2$ cycle coupled to a chemical looping arrangement in accordance with one or more embodiments. The system 100 includes a fuel source 102 and a fuel reactor 104 that receives fuel from the fuel source 102 via at least one conduit. In at least one embodiment, the fuel source 102 can be one or more sour gas fields and as such the fuel can be a sour gas fuel comprising high levels of $H_2S$ or acid gas streams exiting acid removal units.

In one or more embodiments, the fuel can be any type of common gaseous fuels (e.g., natural gas, sour gas, acid gas), liquid fuels (e.g., heavy fuel oil, oil residues, tar, crude oil, crude oil byproducts or distillates), or solid fuels (e.g., coal and petroleum coke). In at least one embodiment, the fuels can be fossil fuel based or carbon containing, renewable based fuel such as biomass or bio-fuels, or a combination of fossil fuels and renewable fuels. In at least one embodiment, the fuel can be a synthetic gas issued from reforming or gasification of any type of feedstocks. The fuel can be fed directly to the system, be emulsified or put in slurry. The system can be particularly efficient for difficult to burn fuels or fuels with high sulfur content that require extensive cleaning or operating at lower temperature to mitigate corrosion issues. As shown in FIG. 1, in at least one embodiment the fuel from the fuel source 102 is transferred to the fuel reactor 104 via conduits 106 and 108. In one or more embodiments, the fuel is transferred to at least one fuel preheater before being transferred to the fuel reactor 104 via conduit 108. As shown in the exemplary system 100 of FIG. 1, in at least one embodiment, the fuel is first transferred from the fuel source 102 to a first fuel preheater 110 to heat the fuel. The heated fuel is then transferred from the first fuel preheater 110 to a second fuel preheater 112 via conduit 106 for further heating. After the additionally heating in second fuel preheater 112, the fuel is transferred from the second fuel preheater 112 to the fuel reactor 104 via conduit 108 that is fluidly connected to the fuel reactor 104 via a fuel inlet.

The fuel reactor 104 is also configured to receive oxygen carriers from an oxygen carrier source 114. The oxygen carriers can be transferred from the source 114 to the fuel reactor 104 via conduit 116, which is in fluid connection with an oxygen carrier inlet of the fuel reactor 104. The oxygen carriers are generally solid particles. For instance, in at least one embodiment, the oxygen carriers can be a calcium-based material such as $CaCO_3$ particles. In one or more embodiments, the oxygen carriers can be CaO or magnesium-based materials or a combination of alkaline earth metals or transition metals such as copper oxides. For sulfur-containing fuels, in one or more embodiments it is preferable to use alkaline earth metals to capture the sulfur in the sulfite and sulfate forms such as CaS and $CaSO_4$. In one or more embodiments, prior to entry into the fuel reactor, the oxygen carriers are first transferred from the oxygen carrier source 114 to a solids preheater 118 for heating, the solids preheater 118 being in fluid connection with the fuel reactor 104. The heated oxygen carriers can then be transferred from the solids preheater 118 to the fuel reactor via conduit 116.

The fuel reactor 104 is generally defined by a housing that defines a hollow interior for receiving the fuel and the oxygen carriers. The fuel reactor is configured to operate at conditions to oxidize (combust) or reform the fuel and oxygen carriers, thereby the resulting in a combusted fuel stream or a reformed fuel stream, respectively, as well as reduced oxygen carriers. The fuel can be either oxidized (combusted) or reformed via this reactor depending on the temperature of the fuel reactor and the composition of the fuel. In other words, the fuel reactor can operate in either a "reforming" mode to produce a reformed fuel stream or a "combust" mode to produce a combusted fuel stream. For example, in embodiments in which the oxygen carriers comprise $CaSO_4$, the $CaSO_4$ oxygen carriers react with the fuel to produce a reformed or combusted fuel stream, CaS (reduced oxygen carriers), and $CO_2$. In embodiments in which the fuel comprises sulfur compounds such as $H_2S$ (e.g., sour gas fuel) and the oxygen carrier is $CaCO_3$, at least a portion of the $CaCO_3$ decomposes into CaO and further reacts with the sulfur components of the fuel to produce CaS as the reduced oxygen carriers.

The reformed fuel stream (or combusted fuel stream) and reduced oxygen carriers are then separated from one another and separately exit the fuel reactor 104. In one or more embodiments, a solid-gas separator, such as a cyclone can be used to separate the reformed (or combusted) fuel stream from the reduced oxygen carriers.

The fuel reactor 104 can further include a controller (not shown) configured to operate the fuel reactor in a particular temperature range. For instance, in one or more embodiments, the controller is configured to operate the fuel reactor in a temperature range of about 800° C. to about 1100° C., or in at least one embodiment, in a temperature range of about 850° C. to about 950° C. With regards to the temperature range of the fuel reactor, the term "about" indicates that the ends of the range can vary by plus or minus 5%.

The system 100 further includes an air source 120 and an air reactor 122 having an inlet that receives an air stream from the air source 120 via conduit 124. The air reactor 122 is generally defined by a housing that defines a hollow interior for receiving the air stream and reduced oxygen carriers from the fuel reactor 104. As shown in FIG. 1, in one or more embodiments the air stream from the air source 120 is transferred to an air preheater 126 before being transferred to the air reactor 122 via conduit 124. The air reactor 122 is also configured to receive reduced oxygen carriers (e.g., CaS) from the fuel reactor 104 via conduit 128.

In the air reactor 122, the air stream oxidizes the reduced oxygen carriers, which results in re-oxidized oxygen carriers and an oxygen-depleted air stream. In embodiments in which the reduced oxygen carriers received from the fuel reactor comprise CaS, the subsequent re-oxidized oxygen carriers comprise $CaSO_4$. The re-oxidized oxygen carriers and the oxygen-depleted air stream then exit the air reactor 122. The air reactor 122 can further include a controller (not shown) configured to operate the air reactor 122 in a particular temperature range. For instance, in one or more embodiments, the controller is configured to operate the air reactor in a temperature range of about 900° C. to about 1200° C., or in at least one embodiment, in a temperature range of about 1050° C. to about 1150° C. With regards to the temperature range of the air reactor, the term "about" indicates that the ends of the range can vary by plus or minus 5%. In certain embodiments, the same controller that controls the temperature of the air reactor 122 controls the temperature of the fuel reactor 104, while in at least one embodiment the fuel reactor 104 and air reactor 122 can have separate controllers. In a particular implementation in which the fuel reactor 104 and the air reactor 122 have separate controllers, the output for the fuel reactor controller (i.e., change in temperature) can be an input for the air reactor controller and/or the output of the air reactor controller can be an input for the fuel reactor controller. Accordingly, in this implementation, the controllers of the air reactor and fuel reactor can work in tandem such that changes in temperature implemented in one of the reactors can result in a signal being sent to the controller of the other reactor such that a corresponding temperature change (if necessary) can be made in that reactor.

In one or more embodiments, the oxygen-depleted air stream and the re-oxidized oxygen carriers can be separated from one another via a solid-gas separator such as a cyclone, and separately exit the air reactor 122. As shown in FIG. 1, in one or more embodiments, a first portion of the re-oxidized oxygen carriers exit the air reactor 122 via conduit 130, which delivers a first portion of re-oxidized oxygen carriers back to the fuel reactor 104. The re-oxidized oxygen carriers received by the fuel reactor 104 are again included in the reaction with the received fuel. Further, in one or more embodiments, a second portion of the re-oxidized oxygen carriers can exit the air reactor 122 via conduit 132. The oxygen-depleted air stream exits the air reactor 122 via conduit 134.

The air reactor 122 and the fuel reactor 104 are in fluid connection with one another via conduits 128 and 130. Further, the circulation of reduced oxygen carriers and re-oxidized oxygen carriers between the fuel reactor 104 and the air reactor 122 (via conduits 128 and 130, respectively) contribute to temperature management of the fuel reactor 104 and the air reactor 122 as the fuel reactor 104 is an endothermic reactor, and the air reactor 122 is an exothermic reactor.

Figure 2:
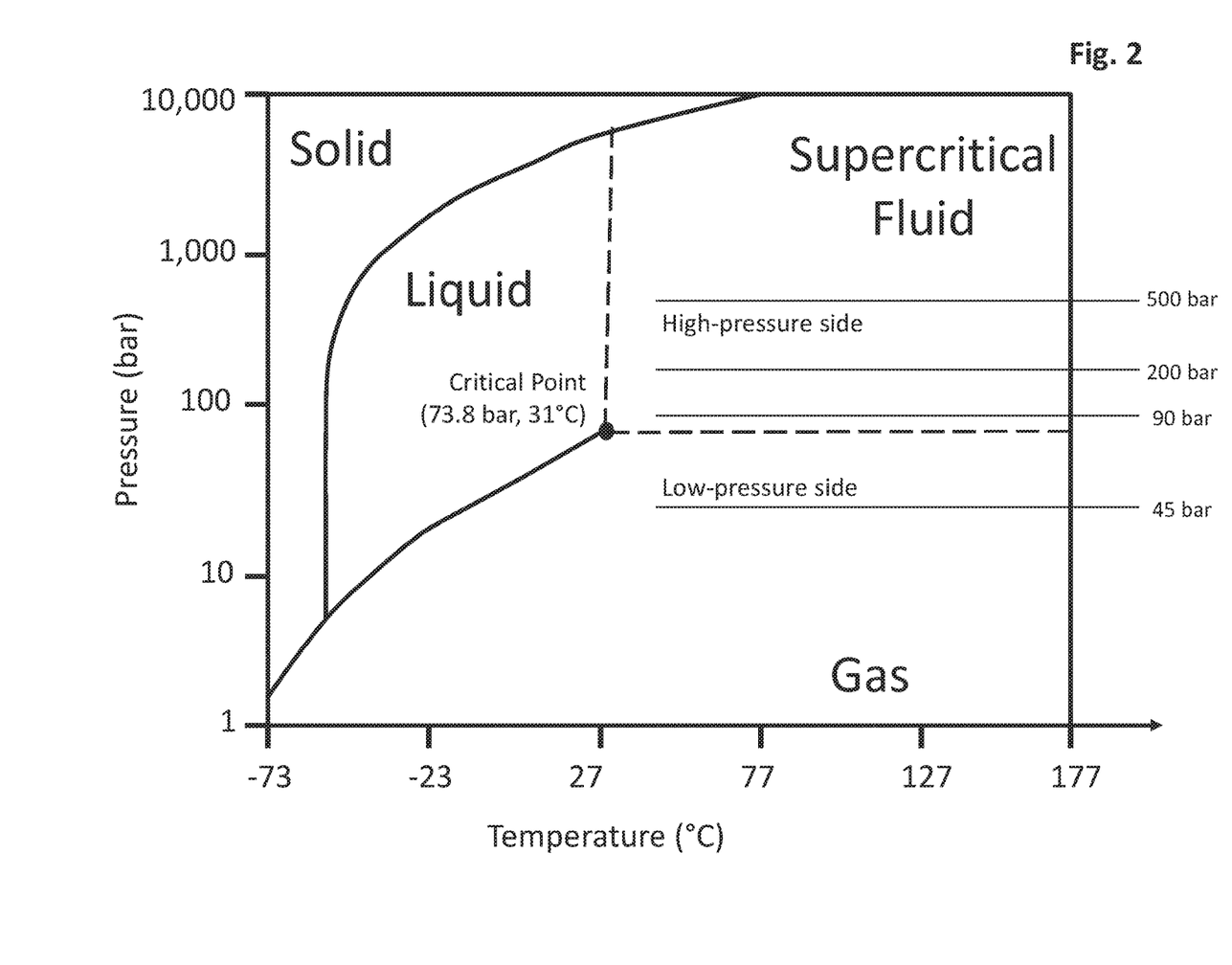
FIG. 2 displays a pressure and temperature phase diagram for $CO_2$, including the operating ranges for the high- and low-pressure sides of the supercritical $CO_2$ cycle in accordance with one or more embodiments.

With continued reference to FIG. 1, the system 100 further comprises a supercritical $CO_2$ cycle that includes a compressor 136 having an inlet for receiving a $CO_2$ stream from a $CO_2$ source 138. The $CO_2$ source 138 can be used to initially fill the system and provide a $CO_2$ make-up that would replenish the $CO_2$ lost through leaks out of the system. The compressor 136 can be configured to increase the pressure of the $CO_2$ stream to create a high-pressure supercritical $CO_2$ stream. Supercritical $CO_2$ is a fluid state of $CO_2$ in which the $CO_2$ is at or above its critical temperature (approximately 31° C.) and its critical pressure (approximately 73.8 bar). A pressure and temperature phase diagram for $CO_2$ is shown at FIG. 2.

In one or more embodiments, the temperature of the $CO_2$ delivered to the system from the $CO_2$ source 138 can be at ambient temperature, and therefore above or below the critical temperature of $CO_2$. When starting to fill the system, the $CO_2$ delivered to the system from the $CO_2$ source 138 can be below the critical pressure of $CO_2$. The pressure of the $CO_2$ can then be raised above the critical pressure value once the system is fully filled. In one or more embodiments, the in-line make-up of $CO_2$ can be done at the operating pressure, which can be controlled by an external unit (e.g., a pump, compressor or expansion valve).

In one or more embodiments, the compressor 136 is a multistage compressor with or without intercooling stages. The compressor 136 enables compression of the $CO_2$ transferring from the low-pressure side of the supercritical $CO_2$ cycle to the high-pressure side of the supercritical $CO_2$ cycle. In one or more embodiments, the low-pressure side of the supercritical $CO_2$ cycle is operated in a pressure range of about 45 bar to about 90 bar, and in at least one embodiment, in a pressure range of about 75 bar to about 80 bar. In one or more embodiments, the high-pressure side of the supercritical $CO_2$ cycle is operated in a pressure range of about 200 bar to about 500 bar, and in at least one embodiment, in a pressure range of about 300 bar to about 400 bar. The low-pressure side of the supercritical cycle is operated around ambient temperatures, between about −40° C. and about +70° C. The high-pressure side of the supercritical cycle is operated in a temperature range of about 400° C. to about 1200° C. The operating ranges of the high-pressure and low-pressure sides of the supercritical $CO_2$ cycle are shown in the phase diagram of FIG. 2. With regards to the pressure ranges of the high- and low-pressure sides, the term "about" indicates that the ends of the ranges can vary by plus or minus 5%. In at least one embodiment, the compressor 136 can include a controller (not shown) configured to control the pressure range of the supercritical $CO_2$ cycle. It should be understood that in one or more embodiments, the system 100 can include one or more sensors for measuring the temperature and pressure of the fluids and/or components of the present system.

In at least one embodiment, the $CO_2$ compression is done in a first step via a multistage compressor to compress the $CO_2$ above the $CO_2$ critical pressure followed by a second step via a dense phase pump to reach the desired supercritical $CO_2$ pressure. The $CO_2$ compressor and dense pump can have direct fluid communication or have an intermediate buffer tank to allow for better operability and control.

As mentioned above, the compressor 136 is configured to increase the pressure of the $CO_2$ stream to create a supercritical $CO_2$ stream. The compressor 136 is also in fluid communication with a first heat exchanger 140. The supercritical $CO_2$ stream from the compressor 136 can then be transported to the first heat exchanger 140 via a conduit 142. In the first heat exchanger 140, the supercritical $CO_2$ stream is heated via heat transferred from the reformed (or combusted) fuel stream. Specifically, the first heat exchanger 140 is also in fluid communication with the fuel reactor 104 via a series of conduits.

As exemplified in the embodiment of FIG. 1, the reformed (or combusted) fuel resulting from the reaction in the fuel reactor exits the fuel reactor via conduit 144 and at least a first portion of the reformed (or combusted) fuel is transferred to conduit 145, which is in fluid communication with the second fuel preheater 112.

More specifically, the first portion reformed (or combusted) fuel is transferred from conduit 144 to the second fuel preheater 112 via conduit 145, and the reformed (or combusted) fuel in the preheater 112 is then used to transfer heat to the fuel stream prior to the fuel stream's entry into the fuel reactor 104. It should be understood that the reformed (or combusted) fuel and the fuel stream are separated within the second fuel preheater 112 (e.g., via a solid wall) such that there is no direct contact between the reformed (or combusted) fuel and the fuel stream.

The reformed (or combusted) fuel is then transferred from the second fuel preheater 112 to the first heat exchanger 140 via conduit 148. In the first heat exchanger 140, the energy of the reformed (or combusted) fuel is transferred to the supercritical $CO_2$ stream, thereby heating the supercritical $CO_2$ stream. Again, it should be understood that the reformed (or combusted) fuel and the supercritical $CO_2$ stream are separated within the first heat exchanger 140 such that there is no direct contact between the reformed (or combusted) fuel and the supercritical $CO_2$ stream. After transferring heat to the supercritical $CO_2$ stream, the first portion of reformed (or combusted) fuel exits the first heat exchanger 140 via conduit 150 and exits the system. In one or more embodiments, the first portion of reformed (or combusted) fuel exiting the system via conduit 150 can be further processed for $CO_2$ removal in instances in which the reformed (or combusted) fuel was the result of complete combustion in the fuel reactor 104. In at least one embodiment, the reformed (or combusted) fuel exiting the system via conduit 150 can be shifted (i.e., shift the CO to $CO_2$ using steam and producing more hydrogen) and/or purified for hydrogen separation or can be further used in a power generation block to generate steam or power.

In at least one embodiment, a second portion of the reformed (or combusted) fuel is transferred from conduit 144 to a conduit 146, which is in fluid communication with the solids preheater 118. The solids preheater 118 is configured to transfer heat from the second portion of the reformed (or combusted) fuel to the oxygen carriers prior to entry of the oxygen carriers into the fuel reactor 104. In at least one embodiment, the oxygen carriers and the second portion of the reformed (or combusted) fuel are separated within the solids preheater 118 such that there is no direct contact between the reformed (or combusted) fuel and the oxygen carriers. In at least one embodiment, the oxygen carriers and the second portion of the reformed (or combusted) fuel are in intimate contact within the solids preheater 118 such that there is a direct contact between the reformed (or combusted) fuel and the oxygen carriers. In such a configuration, a solid/gas separator (e.g., cyclone) is used to separate the oxygen carrier solid stream from the gaseous reformed (or combusted) fuel stream. After transfer of heat to the oxygen carriers, the second portion of the reformed (or combusted) fuel exit the solids preheater 118 and can be purged from the system 100 via conduit 151. In one or more embodiments, the reformed (or combusted) fuel exiting the system at conduit 151 can be merged with the reformed (or combusted) fuel stream of conduit 150 or can exit the system separately. In either configuration, the exiting reformed (or combusted) fuel from conduit 151 can then be further processed for $CO_2$ removal in instances in which the reformed (or combusted) fuel was the result of complete combustion in the fuel reactor 104. In at least one embodiment, the reformed (or combusted) fuel exiting the system via conduit 151 can be shifted (i.e., shift the CO to $CO_2$ using steam and producing more hydrogen) and/or purified for hydrogen separation or can be further used in a power generation block to generate steam or power.

Returning to the supercritical $CO_2$ cycle, the heated supercritical $CO_2$ stream exits the first heat exchanger 140 via conduit 152. Conduit 152 is also in fluid communication with a second heat exchanger 154 such that the supercritical $CO_2$ stream is transferred from conduit 152 to the second heat exchanger 154.

In the second heat exchanger 154, the supercritical $CO_2$ stream is further heated. The supercritical $CO_2$ stream receives heat transferred from a second portion of re-oxidized oxygen carriers delivered from the air reactor 122 and/or a stream of oxygen-depleted air delivered from the air reactor 122. As shown in the embodiment of FIG. 1, the oxygen-depleted air stream exits the air reactor 122 via conduit 134, which is in fluid communication with the second heat exchanger 154. Similarly, the second portion of the re-oxidized oxygen carriers exits the air reactor 122 via conduit 132, which is also in fluid communication with the second heat exchanger 154. In the second heat exchanger 154, the energy from the oxygen-depleted air stream and/or the second portion of re-oxidized oxygen carriers is transferred to the supercritical $CO_2$ stream to further heat the supercritical $CO_2$ stream. In the second heat exchanger 154, the supercritical $CO_2$ stream, the oxygen-depleted air stream, and the re-oxidized oxygen carriers can be separated such that there is no direct contact between them. After the heat transfer, the oxygen-depleted air stream exits the second heat exchanger 154 via conduit 156, which directs the oxygen-depleted air stream out of the system 100. Likewise, the second portion of re-oxidized oxygen carriers exits the second heat exchanger 154 via conduit 158, which directs the second portion of re-oxidized oxygen carriers out of the system 100.

As shown in the embodiment of FIG. 1, the second heat exchanger 154 can be single multi-channel heat exchanger with three streams. In at least one embodiment, the second heat exchanger can be two separate heat exchangers operating in parallel: one between the supercritical $CO_2$ stream and the second portion of re-oxidized oxygen carrier, and another between the supercritical $CO_2$ stream and the oxygen-depleted air stream.

The heated supercritical $CO_2$ stream exits the second heat exchanger 154 via conduit 160 which is in fluid communication with a turbine 162. In one or more embodiments, the heated supercritical $CO_2$ stream exits the second heat exchanger 154 at a temperature in the range of about 400° C. to about 1200° C., and in at least one embodiment, at a temperature in the range of about 550° C. to about 850° C. With regards to the temperature range of the heated supercritical $CO_2$ stream exiting the heat exchanger 154, the term "about" indicates that the ends of the range can vary by plus or minus 5%. The heated supercritical $CO_2$ stream enters the turbine 162, and in the turbine 162 the supercritical $CO_2$ stream is expanded. The expansion of the supercritical $CO_2$ stream in the turbine 162 generates power that is used to drive the compressor 136. In at least one embodiment, the generated power in the turbine 162 can also be used to generate electricity through an electric generator (not shown). Alternatively or additionally, the generated power in the turbine 162 can be used to generate mechanical power to drive process equipment.

Expansion of the supercritical $CO_2$ stream and generation of power by the turbine 162 lowers the pressure of the $CO_2$ stream, and in certain embodiments can lower the pressure of the $CO_2$ stream below its critical pressure value (approximately 73.8 bar) when ambient temperature allows it (e.g., when ambient temperature is below the $CO_2$ critical point temperature or when adding external cooling to reduce the low pressure $CO_2$ stream temperature below the critical point temperature). Otherwise, the low pressure $CO_2$ stream remains in supercritical conditions. The reduced pressure $CO_2$ stream exits the turbine 162 via conduit 164. In one or more embodiments, conduit 164 splits into two conduits 166 and 168, such that a first portion of the reduced pressure $CO_2$ stream enters conduit 166 and a second portion of the reduced pressure $CO_2$ stream enters conduit 168. Conduit 166 is in fluid communication with the first fuel preheater 110 such that the first portion of the reduced pressure $CO_2$ stream is used in the first fuel preheater 110 to transfer heat to the fuel prior to entry of the fuel into the fuel reactor 104. Similarly, conduit 168 is in fluid communication with the air preheater 126 such that the second portion of the reduced pressure $CO_2$ stream is used in the air preheater 126 to transfer heat to the air stream prior to entry of the air into the air reactor. The first portion of the reduced pressure $CO_2$ stream exits the first fuel preheater 110 via conduit 170 and the second portion of the reduced pressure $CO_2$ stream exits the air preheater 126 via conduit 172.

Conduits 170 and 172 both feed into conduit 174, such that both portions of the reduced pressure $CO_2$ stream are transferred into conduit 174. Conduit 174 then transfers the reduced pressure $CO_2$ stream into a cooler 176. In the cooler 176, the reduced pressure $CO_2$ stream is cooled to near ambient temperature. The cooled $CO_2$ stream then exits the cooler 176 via a conduit 178, which is in fluid communication with the compressor 136. Thus, via conduit 178, the cooled $CO_2$ stream is transferred back to the compressor 136 to complete the supercritical $CO_2$ cycle. In other words, the cooled $CO_2$ stream is recycled back to the compressor 136 to continue the supercritical $CO_2$ cycle.

While the systems and methods of the present application have been described above in reference to FIG. 1, the present systems and methods are not limited to such a configuration. For example, in at least one embodiment the turbine 162 can have a medium pressure $CO_2$ extraction point. The extracted, medium-pressure $CO_2$ stream can then be re-heated in one of the air reactor 122 or fuel reactor 104 or one or more of conduits 132, 134, and 144 before its re-introduction into the turbine 162 for higher output. In this configuration, the turbine is considered a turbine with a single-stage re-heat. Other embodiments can include a turbine with double re-heat, in which two $CO_2$ streams exit the turbine via separate extraction points at two different intermediate pressures. The two $CO_2$ streams are both re-heated before injection back into the turbine for more power production.

In at least one embodiment, the supercritical $CO_2$ cycle can include two or three stages in which a re-cycle compressor could be added to the existing $CO_2$ cycle to improve its efficiency.

In at least one embodiment, the supercritical $CO_2$ cycle can include a $CO_2$ compressor coupled directly or via an intermediate vessel tank to a $CO_2$ dense phase pump allowing for the compression of the $CO_2$ to high pressure supercritical state.

In one or more embodiments, the supercritical $CO_2$ cycle can include a regenerator that exchanges heat between the high pressure-low temperature $CO_2$ stream (conduit 142) and low pressure-high temperature $CO_2$ stream (conduit 164). In this embodiment, the regenerator is designed to reduce the temperature pinch in the system and help heat exchangers 140 and 154 on one side, and air preheater 126 and first fuel preheater 110 on the other side.

In at least one embodiment, the high temperature $CO_2$ stream (conduit 164) can exchange heat directly with the fuel reactor 104 through an embedded heat exchanger before feeding the air preheater 126. Similarly, in at least one embodiment, the high-pressure $CO_2$ stream (conduit 160 and/or conduit 152) can be further heated in the air reactor 122 through a heat exchanger embedded in the air reactor 122.

Figure 3:
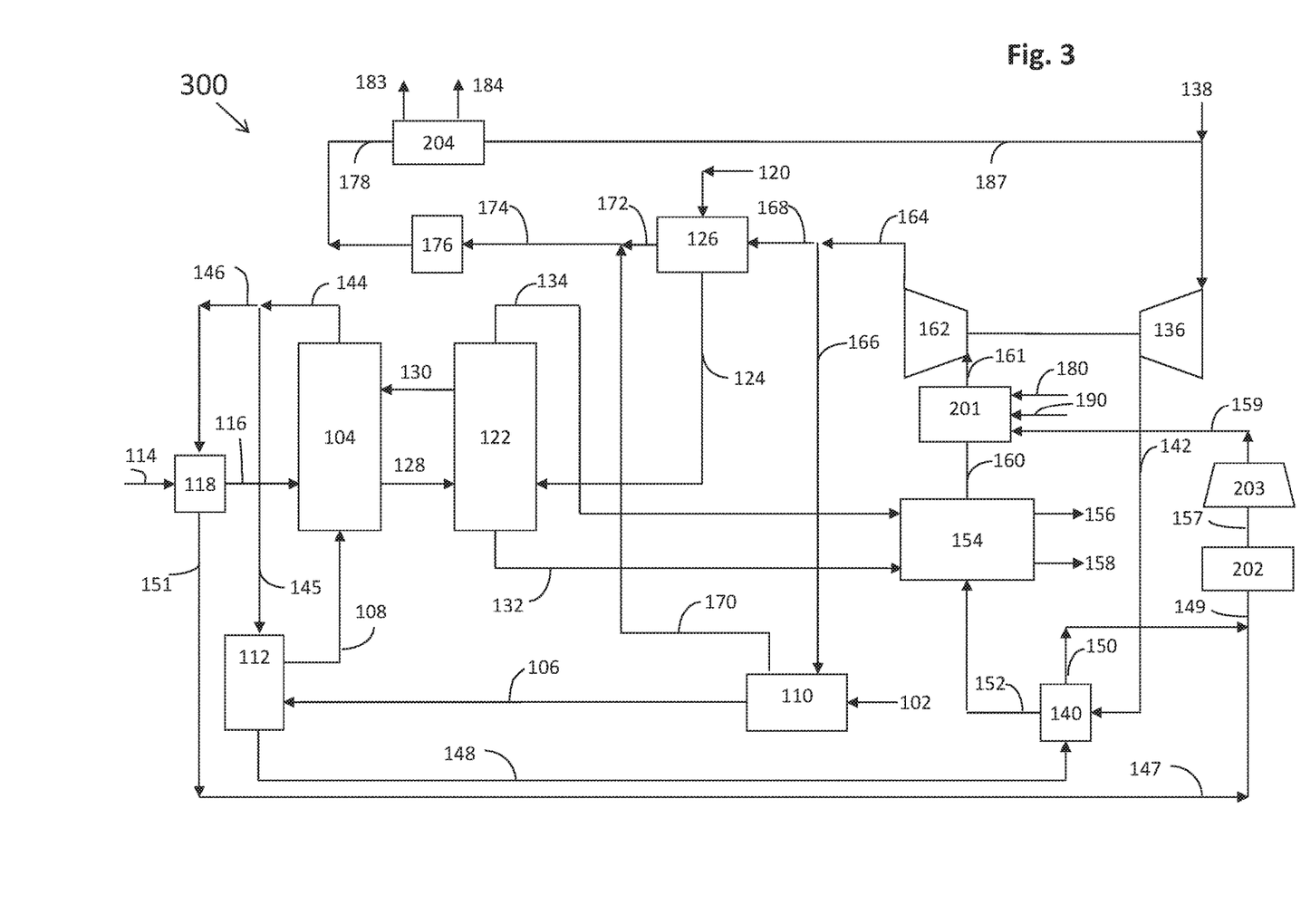
FIG. 3 displays a schematic of another exemplary system that includes a supercritical $CO_2$ cycle coupled to a chemical looping arrangement in accordance with one or more embodiments.

FIG. 3 discloses a schematic of another embodiment of the exemplary system that includes a supercritical $CO_2$ cycle coupled to a chemical looping arrangement in accordance with one or more embodiments. As shown in FIG. 3, the system 300 has a similar configuration as compared with system 100 (with a few additional features) and the common features of system 100 and system 300 operate in substantially the same fashion as described above in reference to system 100 (FIG. 1). As such, aspects of the system that are common to systems 100 and 300 are displayed in FIG. 3 with the same numbers that are used to denote them in FIG. 1.

In system 300, the fuel reactor 104 operates in "reforming mode" (i.e., the fuel stream is reformed, not combusted, in the fuel reactor) such that a reformed fuel stream (e.g., synthetic gas stream) is produced. The reformed fuel stream exits the fuel reactor 104 via conduit 144. The reformed fuel stream is then split into two portion that passed through the same routes as shown in FIG. 1 (i.e., via conduits 145 and 146). Specifically, the first portion of the reformed fuel is transferred from conduit 144 to the second fuel preheater 112 via conduit 145, and the reformed fuel in the preheater 112 is then used to transfer heat to the fuel stream prior to the fuel stream's entry into the fuel reactor 104. The reformed fuel is then transferred from the second fuel preheater 112 to the first heat exchanger 140 via conduit 148. In the first heat exchanger 140, the energy of the reformed fuel is transferred to the supercritical $CO_2$ stream, thereby heating the supercritical $CO_2$ stream. After transferring heat to the supercritical $CO_2$ stream, the first portion of reformed fuel exits the first heat exchanger 140 via conduit 150.

Similarly, the second portion of the reformed fuel is transferred from conduit 144 to a conduit 146, which is in fluid communication with the solids preheater 118. The solids preheater 118 is configured to transfer heat from the second portion of the reformed fuel to the oxygen carriers prior to entry of the oxygen carriers into the fuel reactor 104. After transferring heat to the oxygen carriers, the second portion of reformed fuel exits the solid preheater 118 via conduit 151, which then flows into conduit 147.

As such, both portions of reformed fuel transfer heat to other streams after leaving the fuel reactor 104 and are thereby cooled. The conduits 150 and 147 then merge into conduit 149 such that the two cooled streams of reformed fuel are combined back into one stream. Conduit 149 then feeds into a fuel cooler 202, which runs at ambient conditions (similar to cooler 176). The fuel cooler 202 is configured to further cool the combined stream of reformed fuel to about ambient temperature. The reformed fuel at ambient temperature exits fuel cooler 202 via conduit 157 and is fed to a compressor 203, which causes the pressure of the reformed fuel stream to increase.

The reformed fuel stream exits the compressor 203 via conduit 159, which then feeds the reformed fuel stream to a combustion chamber 201. Additional fuel can be supplied to the combustion chamber 201 through supply line 190. The additional fuel supplied through line 190 can be a portion of the fuel provided from fuel source 102 or can be a separate fuel stream. The fuel supplied through line 190 can be a liquid or gas fuel of the type(s) discussed above with regards to the fuel of fuel source 102. Oxygen can be supplied to the combustion chamber 201 via conduit 180. The oxygen supplied to combustion chamber 201 enables oxy-combustion firing of the reformed fuel stream (synthetic gas stream). As such, the combustion of the reformed fuel stream in the combustion chamber 201 results in the generation of $CO_2$ and water vapor. In one or more configurations, the oxygen delivered to the combustion chamber 201 via conduit 180 can be preheated by transfer of heat from one or both of conduits 156 and 158. In at least one configuration, the oxygen of conduit 180 can be further preheated by a transfer of heat from a conduit stemming off from conduit 134. In one or more embodiments, the combustion chamber 201 is operated in a temperature range of about 1000° C. to about 2000° C. In at least one embodiment, the combustion chamber is operated in a temperature range of about 1300° C. to about 1800° C. In one or more embodiments, the temperature of the combustion chamber 201 is controlled, at least in part, by the flow rate of recycle $CO_2$ stream 187. In one or more embodiments, the supercritical $CO_2$ stream of conduit 160 from the second heat exchanger 154 also passes to the combustion chamber 201 and is combusted.

The flue gas (e.g., $CO_2$ and water vapor) and the supercritical $CO_2$ stream exit the combustion chamber 201 via conduit 161, which feeds to turbine 162. In the turbine the $CO_2$ is expanded and its pressure is reduced. The flue gas and resulting reduced pressure $CO_2$ stream then follow substantially the same route(s) as the reduced pressure $CO_2$ stream in system 100 of FIG. 1. In particular, at least one portion of the flue gas and the reduced pressure $CO_2$ stream exits the turbine 162 and is fed to air preheater 126, where it is used to transfer heat to the air stream prior to entry of the air into the air reactor. Similarly, another portion of the flue gas and reduced pressure $CO_2$ stream exits the turbine 162 and is fed to the first fuel preheater 110, where it is used to transfer heat to the fuel prior to its entry into the fuel reactor. Both portions of the flue gas and reduced pressure $CO_2$ stream are then re-combined in conduit 174 and transferred to cooler 176 for cooling to near ambient temperature. The cooled flue gas/reduced pressure $CO_2$ stream then exits the cooler 176 via a conduit 178.

With continued reference to FIG. 3, conduit 178 then feeds the cooled flue gas/reduced pressure $CO_2$ stream to a gas processing unit 204 that is configured to separate the flue gas (water vapor and $CO_2$) from the main stream of reduced pressure $CO_2$. In one or more embodiments, the gas processing unit 204 can be further configured to provide a $CO_2$ stream of a specified purity for one or more downstream applications (e.g., $CO_2$ conversion technologies, $CO_2$ purity requirements, $CO_2$ sequestration). Off gases and water exit the processing unit 204 via conduits 183 and/or 184. In one or more embodiments, the gas processing unit 204 can be an adsorption-based unit, a cryogenic type unit, or any type of unit that is typically used in oxy-combustion $CO_2$ capture technologies. The main stream of cooled reduced pressure $CO_2$ exits the processing unit 204 via conduit 187, which returns it to the compressor 136. The flow rate of the stream of reduced pressure $CO_2$ in conduit 187 can be regulated to keep the temperature in the combustion chamber 201 within the specified range. Thus, via conduit 187, the reduced pressure $CO_2$ stream is transferred back to the compressor 136 to complete the supercritical $CO_2$ cycle. In other words, the reduced pressure $CO_2$ stream is recycled back to the compressor 136 to continue the supercritical $CO_2$ cycle.

In one or more embodiments, there is a thermal linkage between conduit 160 and conduit 164, as the temperature of the flue gases exiting the turbine 162 is very high. In at least one embodiment, conduit 164 can have a thermal linkage to transfer heat to a bottoming cycle based on steam generation or supercritical $CO_2$ to produce power in the combined cycle. In at least one embodiment, conduit 164 can have a thermal language with gas process unit 204.

Thus, in a salient aspect, the present systems and methods provide a supercritical $CO_2$ cycle that is integrated with a chemical looping cycle such that the supercritical $CO_2$ cycle provides heat to pre-heat the incoming streams into the chemical looping cycle, and where the supercritical $CO_2$ cycle is removing heat from the streams exiting the chemical looping cycle. In other words, in the present system, the hot fluid of a first thermodynamic system (supercritical $CO_2$ cycle) exchanges heat with the cold side of a second thermodynamic system (chemical looping cycle), while the cold fluid of the first thermodynamic system receives heat from the hot side of the second thermodynamic system. While other systems have combined a chemical looping cycle with a supercritical $CO_2$ cycle, these other systems comprise heat exchangers that are only exchanging heat within the thermodynamic system in which it is located. Accordingly, these other systems do not exchange a significant amount of heat between the two thermodynamic systems (chemical looping cycle and supercritical $CO_2$ cycle), and moreover, do not exchange a significant amount of heat in both directions between the two thermodynamic systems.

Although much of the foregoing description has been directed to systems and methods for chemical looping and supercritical $CO_2$ cycles, the system and methods disclosed herein can be similarly deployed and/or implemented in scenarios, situations, and settings far beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A system for coupling a chemical looping arrangement and a supercritical $CO_2$ cycle, the system comprising:
   a fuel reactor having a fuel inlet configured to receive fuel from a fuel source and a carrier inlet configured to receive oxygen carriers, wherein the fuel reactor is configured to react the fuel with the oxygen carriers resulting in reformed or combusted fuel and reduced oxygen carriers;

an air reactor in fluid communication with the fuel reactor, the air reactor having an air stream inlet configured to receive an air stream from an air source, wherein the air reactor is configured to receive the reduced oxygen carriers from the fuel reactor and to re-oxidize the reduced oxygen carriers via the air stream resulting in oxygen-depleted air, wherein the air reactor is configured to transport a first portion of the re-oxidized oxygen carriers back to the fuel reactor;

a compressor having a $CO_2$ inlet configured to receive a $CO_2$ stream from a $CO_2$ source, wherein the compressor is configured to increase the pressure of the $CO_2$ stream thereby creating a high pressure supercritical $CO_2$ stream;

a first heat exchanger in fluid communication with the compressor and the fuel reactor, the first heat exchanger being configured to receive and heat the supercritical $CO_2$ stream, and being configured to receive at least a portion of the reformed or combusted fuel from the fuel reactor, wherein the energy from the reformed or combusted fuel is used to heat the supercritical $CO_2$ stream;

a second heat exchanger in fluid communication with the first heat exchanger and the air reactor, the second heat exchanger being configured to receive and further heat the supercritical $CO_2$ stream received from the first heat exchanger, and being configured to receive the oxygen-depleted air and a second portion of the re-oxidized oxygen carriers from the air reactor, wherein the energy from the oxygen-depleted air and the second portion of the re-oxidized oxygen carriers is used to heat the supercritical $CO_2$ stream; and a turbine in fluid communication with the second heat exchanger, the turbine being configured to receive the supercritical $CO_2$ stream from the second heat exchanger and expand the supercritical $CO_2$, whereby the expansion of the supercritical $CO_2$ generates power, and wherein the turbine comprises an outlet for the expanded supercritical $CO_2$; and wherein the expanded supercritical $CO_2$ is used to heat the fuel from the fuel source and the air stream from the air source prior to their respective deliveries to the fuel reactor and the air reactor.

2. The system of claim 1, further comprising:
a first conduit in fluid communication with the turbine and configured to receive a first portion of the expanded supercritical $CO_2$ from the turbine;
a second conduit in fluid communication with the turbine and configured to receive a second portion of the expanded supercritical $CO_2$ from the turbine;
an air preheater in fluid communication with the first conduit, the air source, and the air reactor, the air preheater being configured to heat the air stream using the energy of the first portion of the expanded supercritical $CO_2$ prior to delivery of the air stream to the air reactor; and
a first fuel preheater in fluid communication with the second conduit, the fuel source, and the fuel reactor, the first fuel preheater being configured to heat the fuel using the energy of the second portion of the expanded supercritical $CO_2$ prior to delivery of the fuel to the fuel reactor,
wherein the heating of the air stream in the air preheater and the fuel in the first fuel preheater by the respective portions of expanded supercritical $CO_2$ results in respective low-pressure streams of $CO_2$.

3. The system of claim 2, further comprising:
a cooler in fluid communication with the air preheater and the first fuel preheater, the cooler being configured to receive the respective low-pressure streams of $CO_2$ from the air preheater and the first fuel preheater and cool the received low pressure $CO_2$; and
a third conduit in fluid communication with the cooler and the compressor, the third conduit being configured to receive the cooled low-pressure $CO_2$ and transfer the cooled low-pressure $CO_2$ to the compressor.

4. The system of claim 2, further comprising a second fuel preheater in fluid communication with the fuel reactor, the first fuel preheater and the first heat exchanger, the second fuel preheater being configured to:
receive the fuel delivered from the first fuel preheater and at least a portion of the reformed or combusted fuel from the fuel reactor; and
further heat the fuel via energy from the reformed or combusted fuel prior to the delivery of the fuel to the fuel reactor.

5. The system of claim 1, further comprising a solids preheater in fluid communication with the fuel reactor, the solids preheater being configured to receive a portion of the reformed or combusted fuel from the fuel reactor and to heat the oxygen carriers using the energy of the reformed or combusted fuel prior to delivery of the oxygen carriers to the fuel reactor.

6. The system of claim 5, wherein the resulting fuel following reaction in the fuel reactor is a reformed fuel, and wherein the system further comprises:
a fuel cooler in fluid communication with the solids preheater and the first heat exchanger, the fuel cooler being configured to receive the reformed fuel from the solids preheater and the first heat exchanger, and to cool the received reformed fuel to about ambient temperature;
a second compressor in fluid communication with the fuel cooler, the second compressor being configured to compress the ambient temperature reformed fuel received from the fuel cooler; and
a combustion chamber in fluid communication with the second compressor and the turbine, the combustion chamber being configured to combust the compressed reformed fuel received from the second compressor to generate a stream of $CO_2$ and water vapor, and to feed the stream of generated $CO_2$ and water vapor to the turbine.

7. The system of claim 6, further comprising:
a gas processing unit in fluid communication with the turbine and downstream of the fuel cooler, the gas processing unit being configured to separate the stream of $CO_2$ and the water vapor received from the turbine from a low pressure $CO_2$ stream received from the turbine.

8. The system of claim 1, wherein the fuel reactor comprises a gas-solid separator configured to separate the reduced oxygen carriers from the reformed or combusted fuel.

9. The system of claim 1, further comprising a controller configured to operate the fuel reactor in a temperature range of about 800° C. to about 1100° C.

10. The system of claim 1, wherein the air reactor comprises a gas-solid separator configured to separate re-oxidized oxygen carriers from the oxygen-depleted air.

11. The system of claim 1, further comprising a controller configured to operate the air reactor in a temperature range of about 900° C. to about 1200° C.

12. The system of claim 1, wherein the compressor is a multistage compressor having intercooling stages, wherein the intercooling stages enable compression of $CO_2$ from a low-pressure side of the supercritical $CO_2$ cycle and transfer of the compressed $CO_2$ to a high-pressure side of the supercritical $CO_2$ cycle.

13. A method for power generation using a coupled chemical looping arrangement and a supercritical $CO_2$ cycle, the method comprising:
heating a fuel stream from a fuel source and an air stream from an air source;
introducing the fuel stream and oxygen carriers into a fuel reactor, wherein the fuel reactor operates under first reaction conditions to result in reformed or combusted fuel and reduced oxygen carriers;
introducing the air stream into an air reactor;
transferring the reduced oxygen carriers from the fuel reactor into the air reactor, wherein the air reactor operates under second reaction conditions to re-oxidize the reduced oxygen carriers resulting in oxygen-depleted air;
transferring a first portion of the re-oxidized oxygen carriers back to the fuel reactor;
introducing a $CO_2$ stream into a compressor, wherein the compressor is configured to increase the pressure of the $CO_2$ stream to create a supercritical $CO_2$ stream;
transferring both the supercritical $CO_2$ stream from the compressor and the reformed or combusted fuel from the fuel reactor to a first heat exchanger, which operates to transfer heat from the reformed or combusted fuel to the supercritical $CO_2$ stream;
transferring a) the supercritical $CO_2$ stream from the first heat exchanger, b) the oxygen-depleted air from the air reactor, and c) a second portion of the re-oxidized oxygen carriers from the air reactor to a second heat exchanger, which operates to transfer heat from the oxygen-depleted air and the second portion of the re-oxidized oxygen carriers to the supercritical $CO_2$ stream; and
receiving, by a turbine, the supercritical $CO_2$ stream from the second heat exchanger, wherein the turbine operates under conditions to expand the supercritical $CO_2$ to generate power,
wherein the expanded supercritical $CO_2$ is used to heat the fuel from the fuel source and the air stream from the air source prior to their respective deliveries to the fuel reactor and the air reactor.

14. The method of claim 13, further comprising:
transferring a first portion of the expanded supercritical $CO_2$ from the turbine to a first conduit;
transferring a second portion of the expanded supercritical $CO_2$ from the turbine to a second conduit;
receiving, by an air preheater, the first portion of the expanded supercritical $CO_2$ from the first conduit; and
receiving, by a first fuel preheater, the second portion of the expanded supercritical $CO_2$ from the second conduit,
wherein the air preheater is configured to transfer energy of the first portion of the expanded supercritical $CO_2$ to the air stream to heat the air stream and wherein the first fuel preheater is configured to transfer energy of the second portion of the expanded supercritical $CO_2$ to the fuel stream to heat the fuel stream, and whereby the transfer of energy from the respective portions of expanded supercritical $CO_2$ results in respective streams of low pressure $CO_2$.

15. The method of claim 14, further comprising:
receiving, by a cooler, the respective streams of low pressure $CO_2$ from the air preheater and the first fuel preheater, wherein the cooler is operated at conditions to cool the received low pressure $CO_2$;
transferring the cooled low-pressure $CO_2$ from the cooler to a third conduit; and
transferring the cooled low-pressure $CO_2$ from the third conduit to the compressor.

16. The method of claim 14, further comprising:
transferring the fuel stream from the first fuel preheater to a second fuel preheater;
receiving, by the second fuel preheater, at least a portion of the reformed or combusted fuel from the fuel reactor; and
heating the fuel stream in the second fuel preheater by transferring energy from the reformed or combusted fuel to the fuel stream.

17. The method of claim 13, further comprising:
heating the oxygen carriers via a solids preheater prior to delivery of the oxygen carriers to the fuel reactor.

18. The method of claim 17, further comprising:
receiving, by the solids preheater, a portion of the reformed or combusted fuel from the fuel reactor, wherein the solids preheater heats the oxygen carriers by transferring energy of the reformed or combusted fuel to the oxygen carriers.

19. The method of claim 18, wherein the fuel resulting from the reaction in the fuel reactor is a reformed fuel, and wherein the method further comprises:
cooling, in a fuel cooler, the reformed fuel received from the solids preheater and first heat exchanger;
compressing, in a second compressor, the cooled reformed fuel received from the fuel cooler;
combusting, in a combustion chamber, the compressed reformed fuel received from the second compressor to produce a stream of $CO_2$ and water vapor; and
feeding the produced stream of $CO_2$ and water vapor to the turbine.

20. The method of claim 19, further comprising:
separating, in a gas processing unit, the stream of $CO_2$ and water vapor received from the turbine from a low pressure $CO_2$ stream received from the turbine.

21. The method of claim 13, wherein the fuel stream comprises a sour gas fuel and the oxygen carriers are calcium-based materials, and wherein the reaction between the sour gas fuel and the calcium-based materials causes at least a portion of sulfur in the sour gas fuel to be removed from the fuel stream.

22. The method of claim 13, further comprising:
transferring the reduced oxygen carriers and the reformed or combusted fuel from the fuel reactor to a gas-solid separator; and
separating, in the gas-solid separator, the reduced oxygen carriers from the reformed or combusted fuel.

23. The method of claim 13, wherein the fuel reactor is operated in a temperature range of about 800° C. to about 1100° C., and wherein the air reactor is operated in a temperature range of about 900° C. to about 1200° C.

24. The method of claim 13, further comprising:
transferring the re-oxidized oxygen carriers and the oxygen-depleted air from the air reactor to a gas-solid separator; and
separating, in the gas-solid separator, the re-oxidized oxygen carriers from the oxygen-depleted air.

25. The method of claim 13, wherein the compressor is a multistage compressor that comprises intercooling stages that enable compression of $CO_2$ from a low-pressure side of the supercritical $CO_2$ cycle and transfer of the compressed $CO_2$ to a high-pressure side of the supercritical $CO_2$ cycle.

26. The method of claim 25, wherein the low-pressure side of the supercritical $CO_2$ cycle is operated in a pressure range of about 45 bar to about 90 bar, and the high-pressure side of the supercritical $CO_2$ cycle is operated in a pressure range of about 200 bar to about 500 bar.

27. The method of claim 13, wherein the temperature of the supercritical $CO_2$ received by the turbine is in a range of about 400° C. to about 1000° C.

\* \* \* \* \*